(12) United States Patent
Slade et al.

(10) Patent No.: US 8,933,005 B2
(45) Date of Patent: Jan. 13, 2015

(54) METHOD AND COMPOSITION FOR REMOVING LATEX PAINT

(71) Applicants: Stefanie Slade, Orem, UT (US); Lani Hatch, Orem, UT (US)

(72) Inventors: Stefanie Slade, Orem, UT (US); Lani Hatch, Orem, UT (US)

( * ) Notice: Subject to any disclaimer, the term of this patent is extended or adjusted under 35 U.S.C. 154(b) by 101 days.

(21) Appl. No.: 13/862,532

(22) Filed: Apr. 15, 2013

(65) Prior Publication Data

US 2013/0274164 A1    Oct. 17, 2013

Related U.S. Application Data

(60) Provisional application No. 61/624,818, filed on Apr. 16, 2012.

(51) Int. Cl.
*C09D 9/00* (2006.01)

(52) U.S. Cl.
CPC ........................................ *C09D 9/00* (2013.01)
USPC ........................................... 510/109; 510/201

(58) Field of Classification Search
USPC .................................................. 510/109, 201
See application file for complete search history.

(56) References Cited

U.S. PATENT DOCUMENTS

| | | | |
|---|---|---|---|
| 2,697,674 A * | 12/1954 | Eisen ............................. | 134/26 |
| 3,563,900 A | 2/1971 | Murphy | |
| 4,579,627 A | 4/1986 | Brailsford | |
| 4,643,840 A | 2/1987 | Brocklehurst | |
| 4,780,235 A | 10/1988 | Jackson | |
| 5,240,509 A * | 8/1993 | Rey et al. ....................... | 134/38 |
| 5,250,189 A * | 10/1993 | Rey ................................ | 210/712 |
| 5,256,703 A * | 10/1993 | Hermann et al. .............. | 521/120 |
| 5,721,204 A | 2/1998 | Maxwell | |
| 5,844,019 A * | 12/1998 | Kato ............................... | 523/116 |
| 5,955,415 A * | 9/1999 | Gutierrez et al. .............. | 510/312 |
| 5,985,812 A | 11/1999 | Ehrenkrona | |
| 5,993,558 A * | 11/1999 | Webster et al. ................ | 134/2 |
| 6,291,397 B1 * | 9/2001 | Wilkins, Jr. .................... | 504/152 |
| 6,666,925 B2 * | 12/2003 | Brackett et al. ................ | 134/6 |
| 6,923,873 B2 | 8/2005 | Pageau | |
| 6,969,303 B1 * | 11/2005 | Rolle et al. .................... | 451/38 |
| 7,524,803 B2 * | 4/2009 | Lentsch et al. ................ | 510/225 |
| 7,748,524 B2 * | 7/2010 | Ruzumna ....................... | 206/209 |
| 8,021,493 B2 * | 9/2011 | Smith et al. ................... | 134/25.2 |
| 8,053,400 B2 * | 11/2011 | Dong et al. .................... | 510/125 |
| 8,796,501 B2 * | 8/2014 | Forrester ........................ | 588/315 |
| 2004/0176263 A1 * | 9/2004 | Filippini et al. ............... | 510/201 |
| 2004/0185296 A1 * | 9/2004 | Mazzanti ........................ | 428/688 |
| 2006/0069005 A1 * | 3/2006 | Song ............................... | 510/220 |
| 2007/0015678 A1 * | 1/2007 | Rodrigues et al. ............ | 510/320 |
| 2010/0242997 A1 * | 9/2010 | Smith et al. ................... | 134/18 |
| 2010/0304096 A2 * | 12/2010 | Tynan et al. ................... | 428/192 |
| 2011/0163043 A1 * | 7/2011 | Kayamori et al. ............. | 210/724 |
| 2012/0122747 A1 * | 5/2012 | Nekmard et al. .............. | 510/218 |

* cited by examiner

*Primary Examiner* — Mark Eashoo
*Assistant Examiner* — M. Reza Asdjodi
(74) *Attorney, Agent, or Firm* — Daniel Boudwin; Global Intellectual Property Agency LLC

(57) ABSTRACT

Disclosed is a paint removing composition including an aluminum containing salt, calcium hydroxide, and calcium sulfate. When applied to wet latex paint, the composition neutralizes the paint molecules and causes the colloid to come out of suspension by the process of flocculation. The composition is prepared as a dry powder and added to a sufficient amount of water to create an aqueous solution. Also disclosed is a method of cleaning paintbrush containing wet paint. The composition is placed in contact with a wet paint-containing paintbrush for a sufficient time to cause the paint to come out of suspension in the form of floc.

6 Claims, No Drawings

METHOD AND COMPOSITION FOR REMOVING LATEX PAINT

CROSS REFERENCE TO RELATED APPLICATION

This application claims the benefit of U.S. Provisional Application No. 61/624,818 filed on Apr. 16, 2012 entitled "Paintbrush and Water Cleaner." The above identified patent application is herein incorporated by reference in its entirety to provide continuity of disclosure.

BACKGROUND OF THE INVENTION

1. Field of the Invention

The present invention relates to a composition of matter suitable for use as a paint remover. The composition is ideally suited to remove wet latex paint from a paintbrush by neutralizing the paint molecules and causing the colloidal paint molecules to come out of suspension by the process of flocculation.

Paint is a composition that can be converted to a solid film after application to a substrate in a thin layer. Paint is commonly used to protect, alter the color of, or provide texture to objects. Conventional paint consists of a pigment, carrier, and a binder. Pigment, or tint, is the coloring agent that remains visible after paint cures. The carrier is the solution that the binder is suspended in, which keeps the binder in liquid form until it is applied to the substrate. Once applied and exposed to air, the carrier either evaporates or chemically bonds through oxidative cross-linking to the painted surface. The binder is the film-forming component of paint that imparts adhesion between the paint and the surface. The binder also influences such properties as gloss, durability, flexibility, and toughness. Binders are categorized according to the mechanisms for drying or curing, with the most common type being water based, otherwise known as latex paint. Latex paint binders are dispersed in the carrier in the form of small insoluble resin particles, thereby creating a colloidal suspension.

As can be appreciated, latex paint is often applied to a surface with a paintbrush. Brushes are available in two basic types, those made with natural bristles, and those with synthetic bristles. It is recommended that natural-bristle brushes not be used with latex paint, as the bristles will absorb the water from the paint, thereby rendering them difficult to work with. Synthetic-bristle brushes, however, can be used to apply latex paints to a substrate.

It is recommended to use a high quality brush when applying paint to a substrate, as less expensive brushes tend to leave bristle marks in the finished paint, and may deposit bristles into the paint that detach from the ferrule. Due to the expense of a quality brush, they are often cleansed of paint and not discarded after use. A common means of removing paint from brushes is with mineral spirits, which is a petroleum based organic solvent. Mineral spirits, however, have several known environmental and health hazards, including central nervous system depression resulting in lack of coordination and slowed reactions, drowsiness, dizziness, nausea, or unconsciousness. It has been desirable to replace mineral spirits with a composition that poses less environmental and health hazards. Because of these concerns, many users attempt to clean latex paint from brushes with only running water. This practice, however, can be time consuming, taking anywhere from 15 to 30 minutes, and requiring large quantities of water. Additionally, a significant amount of the paint is deposited into the sewage system, home septic system, or is placed into the ground where it can contaminate underground water supplies.

2. Description of the Prior Art

Compositions have been disclosed in the prior art that are used to remove paint. These include compositions that have been patented and published in patent application publications. The following is a list of compositions deemed most relevant to the present disclosure, which are herein described for the purposes of highlighting and differentiating the unique aspects of the present invention, and further highlighting the drawbacks existing in the prior art.

Specifically, Ehrenkrona, U.S. Pat. No. 5,985,812 discloses a method of cleaning paint brushes from wet or dry paint or removing paint from painted surfaces. The '812 patent utilizes a lower alkyl ester of a fatty acid that is placed in contact with the brush or painted surface for a sufficient time to cause the paint to dissolve or to come loose from the brush or surface.

Jackson, U.S. Pat. No. 4,780,235 discloses a low toxicity paint remover composition containing $C_1$ to $C_4$ dialkyl esters of $C_1$ to $C_6$ aliphatic dibasic acid, an activator, a thickener, a surfactant and at least one other organic nonhalogen-containing solvent. The paint remover comprises at least 20% by weight of at least one $C_1$ to $C_4$ dialkyl ester of at least one $C_4$ to $C_6$ aliphatic dibasic acid.

Maxwell, U.S. Pat. No. 5,721,204 discloses a paint stripping composition that has a near-neutral pH. The composition includes a peroxide, water and an organic solvent. The solvents may include benzyl alcohol and/or cyclohexane dimethanol, and the peroxide may comprise hydrogen peroxide or urea peroxide.

Brocklehurst, U.S. Pat. No. 4,643,840 discloses an alkaline paint stripper composition that contains either a fibrous material or a combination of a xanthan gum and hectorite clay so as to provide a peelable skin over a painted surface. The composition is applied as a layer over a painted surface to be stripped, and forms a peelable skin thereover. The peelable skin has a tear strength sufficient for it to be separated from the underlying surface as an integral gel. Thus, the layer of composition develops a lateral strength which permits its removal as an intact skin.

Naasani, U.S. Pat. No. 3,563,900 discloses a composition useful in removing paint and similar protective coating from a substrate which comprises an aqueous dispersion of both dissolved and undissolved beta-naphthol. The aqueous dispersion may be either acid, neutral, or mildly alkaline, and in the latter instance may contain mildly alkaline materials such as sodium tetraborate, sodium metasilicate, disodium phosphate, and the like. The composition is particularly useful in removing alkyd and acrylic type paints from aluminum, as it effects rapid removal of these coatings without attack on the aluminum.

SUMMARY OF THE INVENTION

The present invention is a paint neutralizing composition which comprises (a) at least 30% by weight of an aluminum containing salt, (b) at least 10% calcium hydroxide, (c) at least 5% calcium sulfate, and (d) an effective amount of water. The aluminum containing salt is preferably aluminum sulfate or polyaluminum chloride, while the calcium sulfate is preferably derived from gypsum. The composition is prepared as a dry powder and added to a sufficient amount of water to create an aqueous solution. When applied to wet latex paint, the composition neutralizes the paint molecules and causes the colloid to come out of suspension by the process of flocculation.

The present invention is also directed to a method for removing paint from a paintbrush. The method comprises adding the composition to an effective amount of water, placing a brush containing wet latex paint into the aqueous solution, mixing the composition into the water with the brush, removing the brush from the aqueous solution, and rinsing the brush with clean water.

DETAILED DESCRIPTION OF THE INVENTION

The paint remover of the present invention comprises 30 to 65 percent of an aluminum salt, 10 to 30 percent calcium hydroxide, 5 to 40 percent calcium sulfate, and an effective amount of water. These particular compositions are highly effective at removing latex paints. The preferred embodiment comprises about 65 percent aluminum sulfate, 17.5 percent calcium hydroxide, 17.5 percent calcium sulfate, and one gallon of water. The composition is preferably prepared as a dry powder and added to water to form an aqueous solution.

Accordingly, the present invention also relates to a method of cleaning wet paint from a paintbrush, which comprises adding the powder to an effective amount of water to form an aqueous solution, mixing the solution for an adequate amount of time to allow the powder to dissolve in the water, contacting the paintbrush with the aqueous solution for a sufficient time to cause the paint to separate from the brush by the process of flocculation, and rinsing the brush in clean water.

In the preferred method, the brush is used to mix the solution for approximately 20 to 30 seconds. This provides a sufficient amount of time neutralize the paint so it is no longer attracted to the brush. After the Paint in the brush has been neutralized and is no longer attracted to the bristles of the brush, the brush is rinsed in running water, or in a container of clean water, to remove any residual solution or flocs. The amount of powder and water can be increased for cleaning larger items, such as paint roller covers.

The invention will now be described by means of a number of examples. It should be understood that these examples are for illustrative purposes only, and are not to be construed as limiting the invention in any manner.

EXAMPLE 1

A first experimental series was carried out to evaluate various embodiments of compositions to cause latex paint to flocculate. It is well understood that latex paint includes resin binders that are dispersed in the solvent in the form of insoluble resin particles, thereby creating a colloidal suspension. In order to remove the colloid from the suspension in the form of flocs, a clarifying agent is required, which would remove the suspended latex particles from water. A mixture comprising 15 mL of water containing latex paint was added to a series of test tubes. To each test tube was also added 0.1 g of each of the following compounds, as identified and characterized below:

TABLE I

| Test tube number | Chemical 1 | Chemical 2 | Observations After 15-30 minutes | After 24 hours |
|---|---|---|---|---|
| 1 | Ferrous Sulfate | Bentonite | No separation | |
| 2 | Ferrous Sulfate | Calcium Hydroxide | No separation | |
| 3 | Ferrous Sulfate | Calcium Carbonate | No separation | |
| 4 | Ferrous Sulfate | Sodium Bicarbonate | No separation | |
| 5* | Ferrous Sulfate | | No separation | pH problems |
| 6 | Ferrous Sulfate | Gypsum | No separation | |
| 7 | Ferrous Sulfate | Sodium Aluminum Sulfate | No separation | |
| 10* | Polyaluminum chloride | | Separation, not clear | |
| 11 | Polyaluminum chloride | Bentonite | ½ up, ½ down | |
| 12 | Polyaluminum chloride | Calcium Hydroxide | Great separation | |
| 13 | Polyaluminum chloride | Calcium Carbonate | ¾ up, ¼ down | |
| 14 | Polyaluminum chloride | Sodium Bicarbonate | ⅞ down, ⅛ up | |
| 15 | Polyaluminum chloride | Gypsum | ¾ down, ¼ up | |

*Control

As shown in Table I, the use of ferrous sulfate and a secondary compound produced no flocculation when added to the paint water mixture. No separation was observed in the control test tube, or with the use of any secondary compounds. The use of polyaluminum chloride along with a secondary compound, however, demonstrated separation to various extents. Test tube number 10 demonstrates that polyaluminum chloride by itself created no separation, making it evident that the presence of the secondary compound along with polyaluminum chloride was necessary to produce separation. The most effective secondary compounds were calcium hydroxide, sodium bicarbonate, and gypsum, as shown in test tube numbers 12, 14, and 15. A second experimental series investigated the use of a different aluminum salt, along with various mixtures containing the effective secondary compounds from the first experimental series. Also tested was a mixture of the effective secondary compounds only, as identified and characterized in Table II below:

TABLE II

| Test tube number | Chemical 1 | Chemical 2 | Chemical 3 | Observations After 15-30 minutes | After 24 hours |
|---|---|---|---|---|---|
| 20 | Aluminum Sulfate | Gypsum | Sodium Bicarbonate | ¾ up, ¼ down | |
| 21 | Aluminum Sulfate | Gypsum | Calcium Hydroxide | All down, clear | Will not mix with fresh water |
| 22 | Aluminum Sulfate | Calcium Hydroxide | | All down, cloudy | |
| 24 | Calcium Hydroxide | Gypsum | | Poor separation | |

It will be seen, from the foregoing, that test tube 21 containing aluminum sulfate, gypsum, and calcium hydroxide produced the desired separation. The paint water flocculated, causing the latex paint that was suspended in the water to separate and settle to the bottom of the container, with no residual particles floating to the top or left in suspension. Test tube number 24 also demonstrates that calcium hydroxide and gypsum alone are insufficient to produce the desired results, suggesting that an aluminum containing salt is also required in order to produce effective separation. It is also evident from test tube 22 that aluminum sulfate and calcium hydroxide without gypsum cause flocculation, but did not remove all of the paint from the suspension.

The second experimental series suggests that the ideal composition includes sulfate, gypsum, and calcium hydroxide. A third experimental series was carried out to evaluate various ratios of aluminum sulfate, gypsum, and calcium hydroxide in order to determine the most effective ratios for removing wet paint from a conventional paintbrush. The following compositions were each mixed with one gallon of water, and tested with a paintbrush containing wet latex paint, as identified and characterized in Table III below:

TABLE III

| Composition | Aluminum Sulfate | Gypsum | Calcium Hydroxide | Results |
|---|---|---|---|---|
| A | 7.4 g | 3.3 g | 2.5 g | Little separation |
| B | 14.8 g | 0 g | 2.5 g | All down, cloudy |
| C | 3.7 g | 5.0 g | 2.5 g | No separation |
| D | 11.1 g | 1.7 g | 2.5 g | All down, cloudy |
| E | 9.2 g | 2.5 g | 2.5 g | All down, clear |

The foregoing suggests that the ideal composition for removing paint from a conventional paintbrush containing latex paint is Composition E, comprising 9.2 g aluminum sulfate, 2.5 g gypsum, and 2.5 g calcium hydroxide dissolved in one gallon of water. This composition caused the paint from the brush to separate from the bristles and flocculate, with no suspended paint particles remaining in the water. As can be appreciated, Composition E comprises about 65 percent aluminum sulfate, 17.5 percent calcium hydroxide, 17.5 percent calcium sulfate, and one gallon of water. A fourth experimental series was carried out to evaluate the effect of altering the ratio of Composition E. The following compositions were each mixed with one half gallon of water, and tested with a paintbrush containing wet latex paint, as identified and characterized in Table IV below:

TABLE IV

| Composition | Aluminum Sulfate | Gypsum | Calcium Hydroxide | Results |
|---|---|---|---|---|
| A | 4 | 2 | 1 | All down, slightly cloudy |
| B | 4.5 | 2 | 1 | All down, slightly cloudy |
| C | 5 | 2 | 1 | All down, slightly cloudy |
| D | 5 | 2 | 1.5 | All down, slightly cloudy |
| E | 5 | 2.5 | 1.5 | All down, slightly cloudy |
| F | 5 | 3 | 1.5 | All down, slightly cloudy |
| G | 5.2 | 3 | 1.5 | All down, slightly cloudy |
| H | 5 | 2.5 | 2 | Most rose to the top |
| I | 5 | 3 | 1.5 | Most rose to the top |
| J | 4.6 | 2.5 | 1.4 | All down, slightly cloudy |
| K | 4.6 | 2.5 | 1.3 | Most sank, some rose to the top, cloudy water |
| L | 3 | 4 | 4 | Very cloudy, all solid, sunk to the bottom |
| M | 6 | 3 | 1 | Some floated to the top, most sunk to the bottom, slightly cloudy water |
| N | 6.5 | .5 | 1 | Most floated to the top, cloudy water |

Table IV shows that varying the ratios of aluminum sulfate, gypsum, and calcium hydroxide produce the desired precipitate while leaving residual amounts of the paint suspended in the water. The foregoing ratios from Table IV demonstrate that separation will occur to some extent with a ratio of 30 to 65 percent aluminum sulfate, 10 to 30 percent calcium hydroxide, 5 to 40 percent gypsum, and an effective amount of water.

It is therefore submitted that the foregoing discussion, description, and examples refer to what is considered to be the most practical and preferred embodiments of the present invention. It is recognized, however, that the formulations are illustrative of some embodiments of the present invention, but are not meant to be limitations upon the practice thereof. The specific compositional ranges employed will depend upon the size of the paint brush, the amount of paint contained thereon, and the number of brushes to be cleaned. It is the following claims, including all equivalents, which define the scope of the invention.

We claim:

1. An aqueous paint removing composition consisting essentially of:
    at least 30% by weight of an aluminum containing salt;
    at least 10% calcium hydroxide; and
    at least 5% calcium sulfate.

2. The composition of claim 1, wherein said aluminum containing salt is selected from the group consisting of aluminum sulfate, polyaluminum chloride, and combinations thereof.

3. An aqueous paint removing composition comprising by weight:
    30 to 65% aluminum sulfate;
    10 to 30% calcium hydroxide; and
    5 to 40% gypsum.

4. A method of cleaning wet paint from paintbrushes comprising the steps of:

adding a composition comprising 30 to 65% aluminum sulfate, 10 to 30% calcium hydroxide, and 5 to 40% gypsum to an effective amount of water to form an aqueous solution;

mixing said composition for an adequate amount of time to allow said composition to dissolve in the water;

contacting said paintbrush with said aqueous solution for a sufficient time to cause said paint to dissolve or separate from said brush and form flocs;

and rinsing the brush in clean water.

5. The method of claim 4, further comprising the steps of using said paintbrush to mix said composition for approximately 20 to 30 seconds.

6. The method of claim 4, wherein said effective amount of water is one gallon.

* * * * *